US010008238B2

(12) United States Patent
Waterston et al.

(10) Patent No.: US 10,008,238 B2
(45) Date of Patent: Jun. 26, 2018

(54) SYSTEM AND METHOD FOR INCORPORATING DIGITAL FOOTAGE INTO A DIGITAL CINEMATOGRAPHIC TEMPLATE

(71) Applicant: WATERSTON ENTERTAINMENT (PTY) LTD, Garsfontein, Pretoria (ZA)

(72) Inventors: Grant Waterston, Pretoria (ZA); Johann Mynhardt, Pretoria (ZA)

(73) Assignee: WATERSTON ENTERTAINMENT (PTY) LTD, Garsfontein, Pretoria (ZA)

( * ) Notice: Subject to any disclaimer, the term of this patent is extended or adjusted under 35 U.S.C. 154(b) by 0 days. days.

(21) Appl. No.: 14/888,654

(22) PCT Filed: Apr. 29, 2014

(86) PCT No.: PCT/ZA2014/000023
§ 371 (c)(1),
(2) Date: Nov. 2, 2015

(87) PCT Pub. No.: WO2014/205460
PCT Pub. Date: Dec. 24, 2014

(65) Prior Publication Data
US 2016/0071544 A1    Mar. 10, 2016

(30) Foreign Application Priority Data
May 2, 2013   (ZA) .................................. 2013/03191

(51) Int. Cl.
*G11B 27/00*    (2006.01)
*G11B 27/034*   (2006.01)
(Continued)

(52) U.S. Cl.
CPC ........... *G11B 27/034* (2013.01); *H04N 5/272* (2013.01); *H04N 7/00* (2013.01); *H04N 21/4347* (2013.01);
(Continued)

(58) Field of Classification Search
CPC ... H04N 5/272; H04N 21/8549; G11B 27/034
(Continued)

(56) References Cited

U.S. PATENT DOCUMENTS 7,362,946 B1 *  4/2008  Kowald ............... G11B 27/034
                                                  360/13
2008/0246777 A1 * 10/2008  Swanson ............... H04N 5/272
                                                  345/640
(Continued)

FOREIGN PATENT DOCUMENTS

WO   2009/079560 A1   6/2009
WO   2010/002921 A1   1/2010
WO   2010/033233 A1   3/2010

OTHER PUBLICATIONS

International Search Report for International Patent Application No. PCT/ZA2014/000023 dated Jul. 21, 2015.

*Primary Examiner* — Thai Tran
*Assistant Examiner* — Jose Mesa
(74) *Attorney, Agent, or Firm* — Ware, Fressola, Maguire & Barber LLP (57) ABSTRACT

The invention provides a system, method and device—for inserting digital footage into a digital cinematographic template. The system includes a mobile device, storage means on the mobile device for storing a digital cinematographic template, video recording means on the mobile device for recording and capturing personal cinematographic footage, digital isolation means on the mobile device for isolating specific sections of captured personal cinematographic footage, digital extraction means on the mobile device for extracting the isolated sections of the captured personal cinematographic footage, and digital insertion means on the mobile device for inserting the extracted footage into the stored cinematographic template.

7 Claims, 8 Drawing Sheets

(51) Int. Cl.
*H04N 5/272* (2006.01)
*H04N 7/00* (2011.01)
*H04N 21/434* (2011.01)
*H04N 21/44* (2011.01)
*H04N 21/8549* (2011.01)

(52) U.S. Cl.
CPC ... *H04N 21/44008* (2013.01); *H04N 21/8549* (2013.01)

(58) Field of Classification Search
USPC .......................................................... 386/278
See application file for complete search history.

(56) References Cited

U.S. PATENT DOCUMENTS

| | | | |
|---|---|---|---|
| 2010/0066810 A1* | 3/2010 | Ryu | H04N 5/232 |
| | | | 348/36 |
| 2010/0220197 A1 | 9/2010 | Dukellis et al. | |
| 2011/0038611 A1* | 2/2011 | Gianutsos | G06Q 30/0607 |
| | | | 386/279 |
| 2013/0083215 A1* | 4/2013 | Wisniewski | H04N 5/23222 |
| | | | 348/222.1 |

* cited by examiner

SYSTEM AND METHOD FOR INCORPORATING DIGITAL FOOTAGE INTO A DIGITAL CINEMATOGRAPHIC TEMPLATE

This application is a National Stage Application of PCT/ZA2014/000023, filed 29 Apr. 2014 and which claims benefit of Serial No. 2013/03191, filed 2 May 2013 in South Africa, and which applications are incorporated herein by reference. To the extent appropriate, a claim of priority is made to each of the above disclosed applications.

TECHNICAL FIELD OF THE INVENTION

This invention relates to a system and method of digitally inserting personal footage into a pre-existing digital media template.

BACKGROUND TO THE INVENTION

The inventor is aware of digital effect processes which are used to capture the features of an actor and inserting these features into existing digital video footage. A well known example of the current state of the art is depicted in the film "Forest Gump" wherein the title character played by Tom Hanks is shown meeting various former presidents of the United States of America. Here existing footage of the presidents were manipulated in order to digitally insert the actor. These existing methods are applied in post production using extensive technological resources and are often conducted on a frame by frame basis.

It is an object of the invention to provide a commercially available alternative to existing digital insertion technology.

GENERAL DESCRIPTION OF THE INVENTION

According to the invention there is provided a system for inserting digital footage into a digital cinematographic template, which system includes:
  a mobile device;
  storage means on the mobile device for storing a digital cinematographic template;
  video recording means on the mobile device for recording and capturing personal cinematographic footage;
  digital isolation means on the mobile device for isolating specific sections of captured personal cinematographic footage;
  digital extraction means on the mobile device for extracting the isolated sections of the captured personal cinematographic footage; and
  digital insertion means on the mobile device for inserting the extracted footage into the stored cinematographic template.

Guides may preferably be provided on a video recording interface in order to establish borders within which the footage will be differentiated and isolated. The guides may be static or dynamic. The use of facial identification and tracking (using known algorithms) may also be used by users of the software to line objects or actors within video interface guides since the software will be able to identify the general positioning of the user within the video frames.

The system may include a video compositing engine for rendering video through the compositing engine using a standardised template definition file created by artist and technicians. These XML Template definition files define the data for any particular composite and the compositing engine loads this data at run-time creating and performing the necessary compositing operations.

The system will make use of multiple passes of video recording thus requiring the user to record more than one video. These different user generated videos can then be composited together and layered in various ways to create visual effects according to a template.

The system may include formatting means in order to change the format of the captured personal footage.

The system may include editing means in order to edit the captured personal footage to a required standard.

The mobile device may take the form of a portable electronic device, which include but are not limited to a cellular phone, laptop, notebook or tablet device.

The storage means may take the form of a memory module such as a memory card or any other electronic storage medium. The cinematographic template typically takes the form of a short film, with specific characters omitted. It is to be appreciated that the roles of the omitted characters can be filled by capturing footage of individuals with the mobile device.

The video recording and capture means may take the form of an integrated camera, many mobile devices such as smartphones and tablets incorporate the necessary video capture facilities typically using a video capture interface. The video capture interface may be provided with guides, which could serve as an indication of alignment for a user of the video capture means, these guides may be provided to indicate the relative location of the person or other objects within the cinematographic template.

The digital isolation means may include one or a combination of facial recognition or identification technology, object tracking, for instance pixel based tracking. Similarly with the use of chroma or luminance keying certain sections of the captured personal footage can be excluded based on brightness and/or colour. Using pixel tracking will allow the chroma keyer to know the approximate position and area of an actor or object in the footage allowing it to intelligently sample pixels that fall outside the area of the object or actor for removal. Combining this technique with known edge detection algorithms will further enhance the software's ability to determine the position and area of an object or actor in the footage. Tracking the movement of edges over time in relation to facial tracking or pixel tracking data will allow the software to determine which pixels in the image form part of the actor or object's movement (such as hair since hairstyles can be significantly different in volume between different people), thus allowing the software to more intelligently distinguish the background from the actor and select the appropriate pixel samples for chrome key removal. The digital isolation may also be done in conjunction with tracking the movement of the mobile device, many mobile devices, especially tablets, include motion or orientation tracking facilities, which can be monitored in order to determine and track the sections of the captured footage being isolated.

The extraction means will typically take the form of a video processing algorithm in order to extract the isolated captured footage. This extracted footage can be edited through use of the editing means, with the colour and brightness adjusted to match with the colouring and lighting of the template. The format of the extracted footage can also be altered through the use of a formatting algorithm in order to match extracted footage with the template into which it is to be inserted.

The digital insertion means will also typically take the form of an algorithm in order to track the edges of the inserted footage and the edges of the areas into which the captured footage is to be inserted. The insertion means may make use of rotoscoping, which overlays the extracted footage over the digital template. The use of a layering system may also be implemented with different sections of the digital template assigned various layers. The extracted footage may be inserted between the assigned layers, in order to integrate the extracted footage into the digital template.

The system may include a central database for storing additional downloadable templates as well as storing and making available for sharing integrated cinematographic films. The system may also include communication means in order to establish a link between the mobile device and the central database for the transfer of necessary information.

According to a second aspect of the invention there is provided a method of making a personalised cinematographic film by means of an integrated application on an electronic device, which method includes:
providing a digital cinematographic template on the electronic device;
recording and capturing digital footage on the electronic device;
isolating specific sections of the captured digital footage;
extracting the isolated sections of the captured digital footage; and
inserting the extracted footage into the digital cinematographic template in order to create a personalized cinematographic film.

The method may preferably include providing a guide on a video recording interface in order to establish borders within which the footage will be differentiated and isolated. The guides may be static or dynamic.

The method may include the step of compositing video using a video compositing engine for rendering video using a standardised template definition file created by artist and technicians. These XML Template definition files define the data for any particular composite and the compositing engine loads this data at run-time creating and performing the necessary compositing operations.

The method may include providing a central database for storing additional downloadable templates, as well as for uploading the completed personalized cinematographic films onto the central database, and accessible by others.

The digital cinematographic templates may be stored on a computer accessible media storage device on the electronic device which is typically in the form of a smartphone or tablet. These storage devices typically include RAM, ROM or flash memory.

The digital footage may be recorded and captured on the electronic device by means of integrated video capture facilities available on many mobile devices.

Specific sections of the captured digital footage is typically isolated using the techniques described above, such as face tracking or recognition, chroma or luminance keying in order to establish the borders of objects to be inserted based on differences in light, shading and or colour. Guides may also be provided on a video capture interface in order to establish borders within which the footage will be differentiated and isolated.

The isolated footage is extracted and may be edited, converted or reformatted depending on the requirements of the template being used, typically captured footage may be darkened or lightened in order to seamlessly integrate the captured footage into the digital template.

The extracted footage is typically inserted into the template based on defined insertion borders and layers. Layering of the digital template may enable the integrated application to display parts of the captured footage and certain instances whilst hiding them during other scenes. This is an advantage above traditional rotoscoping techniques which in certain cases could only overlay captured footage.

According to a third aspect of the invention there is provided an electronic device for making a personalised cinematographic film which electronic device includes:
a storage medium for storing a digital cinematographic template;
a camera for recording and capturing digital cinematographic footage;
a processor operable to run an integrated application which application is configured to:
isolate specific parts of the captured digital cinematographic footage;
extract the isolated sections of the digital footage; and
insert the extracted digital footage into the digital cinematographic template in order to form a personalised cinematographic template.

Guides may preferably be provided on a video recording interface of the device in order to establish borders within which the footage will be differentiated and isolated. The guides may be static or dynamic.

The device may include a compositing engine for rendering video through the compositing engine using a standardised template definition file created by artist and technicians. These XML Template definition files define the data for any particular composite and the compositing engine loads this data at run-time creating and performing the necessary compositing operations.

The electronic device may include communication means in order to transmit data from the device to a central storage database or alternatively to download data such as additional cinematographic templates from the central database.

As with the system above the integrated application may additional include formatting, conversion or editing facilities in order to alter the extracted digital footage as required.

The electronic device is typically in the form of a mobile phone or tablet device.

DETAILED DESCRIPTION OF THE INVENTION

The invention is now described by way of non-limiting example with reference to the accompanying drawings.

In the drawings:

FIGS. 1 through 7 show a series of schematic representations of an electronic device in running an application for making a personalised cinematographic film, in accordance with the invention.

Referring now to the drawings, the electronic device, in accordance with the invention, is generally indicated by reference numeral 10.

The application is downloaded and installed on the electronic device 10 typically in conjunction with a number of cinematographic templates 12. In the figures the process of inserting footage of a child into a Space themed template is provided for explanatory purposes. Once the template 12 is selected, a user is provided with an introductory or explanatory sequence 13 in order to establish the extent of the images that must be captured in order to fill omissions within the template 12.

The user then proceeds to use the video recording and capture facilities of his electronic device 10 in order to capture the necessary personal digital footage 14. A video capture user interface 16 is provided with guides 18 in order to establish the extents within which a person or object being captured 19 can move in order to fill the required areas in the template. For the template example shown the little boy 19, will be shown operating a space craft, thus the movement of the boy 19 is limited to a seated position in which he can operate the controls of the space craft. These controls allow for a little bit more movement, also indicated by the guides 18 displayed on the camera interface.

Once the video 14 is captured, the primary parts are isolated by means of an algorithm that identifies a border or specific features and tracks these features or objects for the duration of the footage. The border is established by comparing the colour and brightness of pixels and based here-on the boy can be isolated in relation to the white background 20. Techniques used to isolate the necessary sections of the captured video include tracking of the object for extraction from the device's camera video using pixel based tracking technology, facial tracking, tracking a combination of pixels. Furthermore the movement of the electronic device can also be incorporated by means of the phone's motion sensors in order to produce a triangulation of the object in a 3 Dimensional space allowing the motion to be matched and adjusted to the motion of the video template. The inventor also foresees that through tracking the movements of the electronic device, the movement and orientation of the digital cinematographic template may also be altered and varied accordingly.

Once the specific objects are isolated these sections are extracted and formatted. The captured footage may not be of the correct color or lighting scheme and it is at this stage that changes can be applied. It is not only the aesthetic features that can be formatted, but this may also relate to the digital format, as the saved templates may not be of the same digital format and the captured footage must first be converted before it can be inserted into the template.

As a final step the extracted footage is inserted into the digital template, creating a personalized cinematographic film 22. In the example provided in the figures the child is shown piloting the space ship and winds up the winner of space battle. It is to be appreciated that an unlimited number of templates can be used and that the videos captured are not limited to visual components, but can be extended to audio applications as well.

Figure 1:
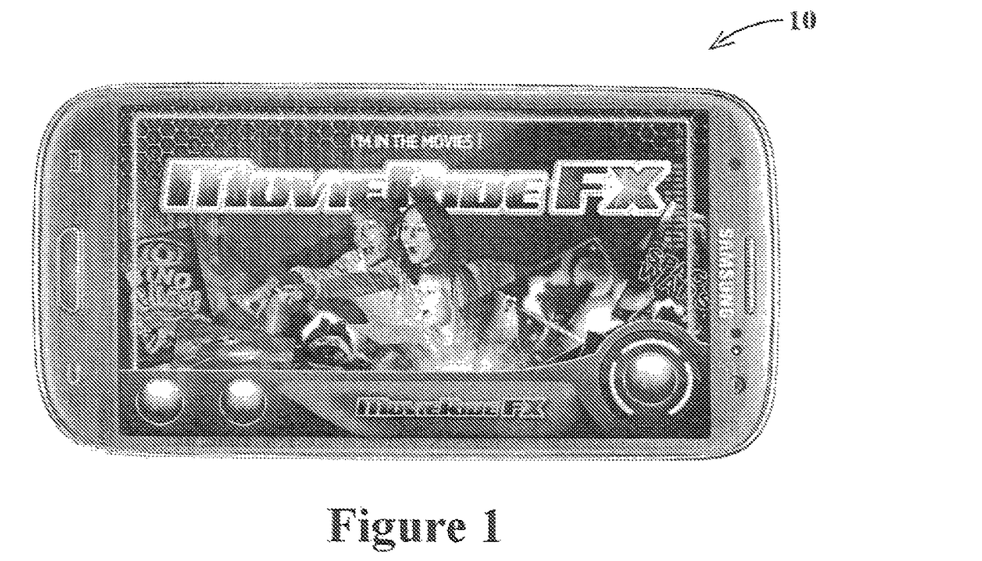
FIG. 1 shows a schematic representation of an electronic device in running an application for making a personalised cinematographic film, in accordance with the invention.
Figure 2:
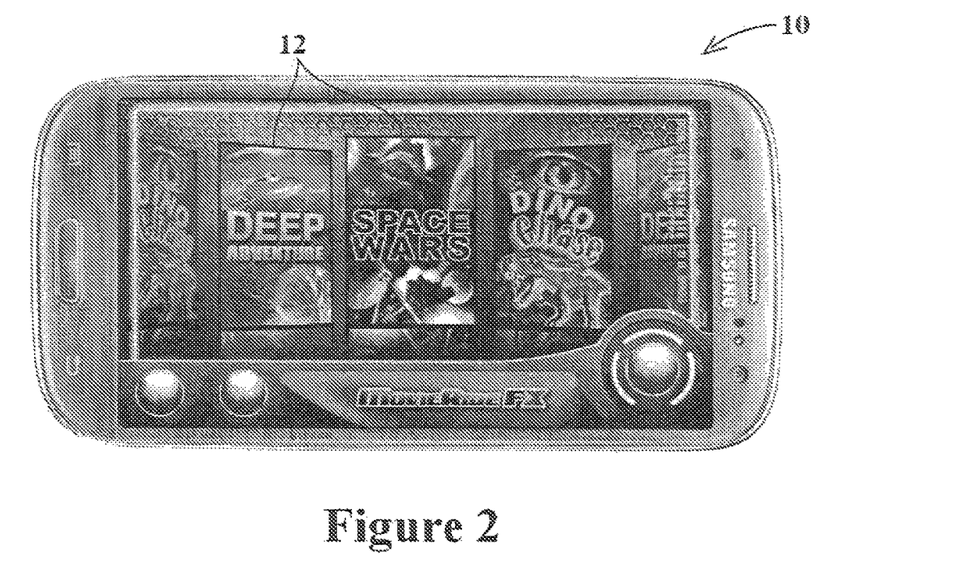
FIG. 2 shows a further schematic representation of an electronic device in running an application for making a personalised cinematographic film, in accordance with the invention.
Figure 3:
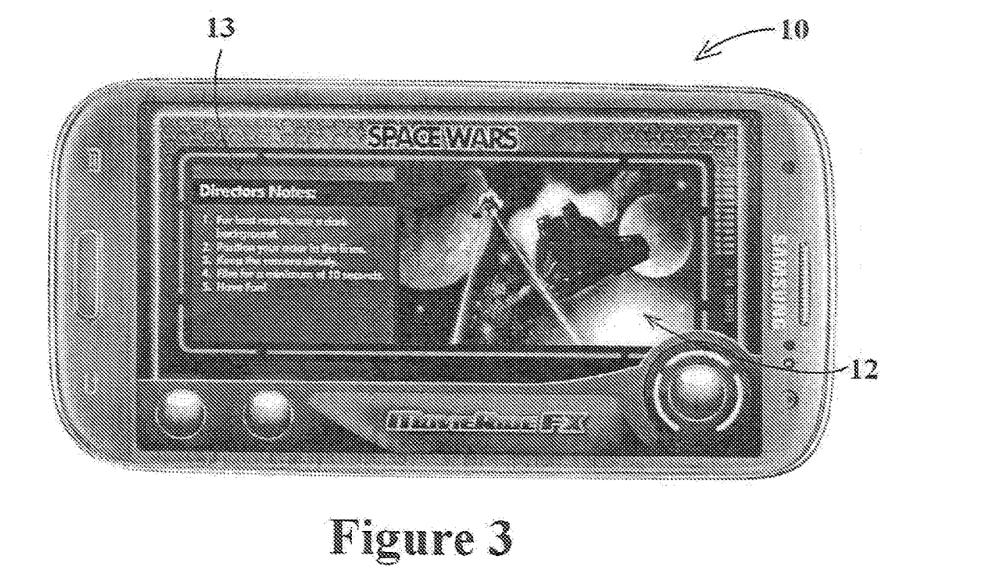
FIG. 3 shows a further schematic representation of an electronic device in running an application for making a personalised cinematographic film, in accordance with the invention.
Figure 4:
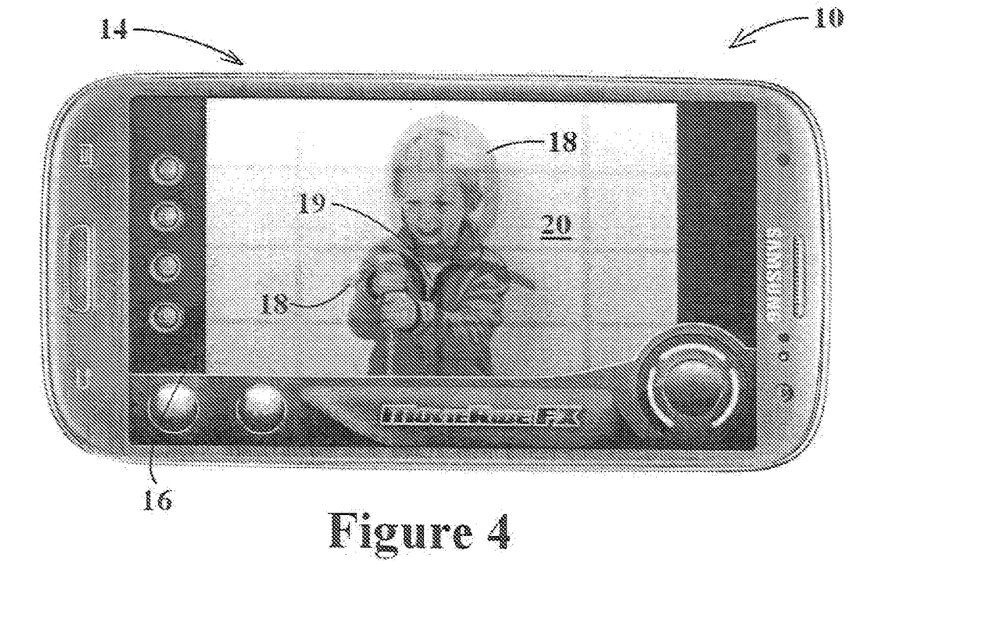
FIG. 4 shows a further schematic representation of an electronic device in running an application for making a personalised cinematographic film, in accordance with the invention.
Figure 5:
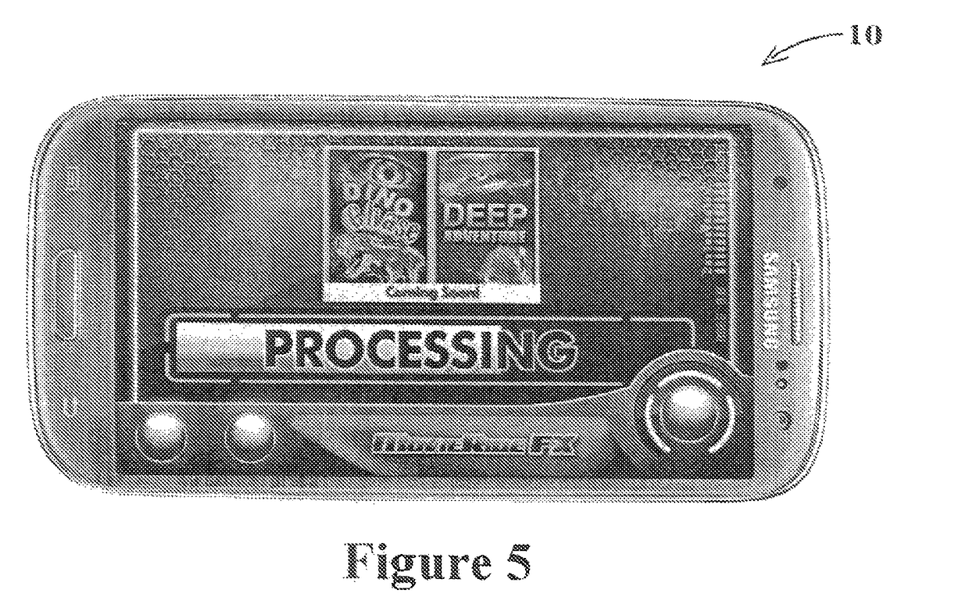
FIG. 5 shows a further schematic representation of an electronic device in running an application for making a personalised cinematographic film, in accordance with the invention.
Figure 6:
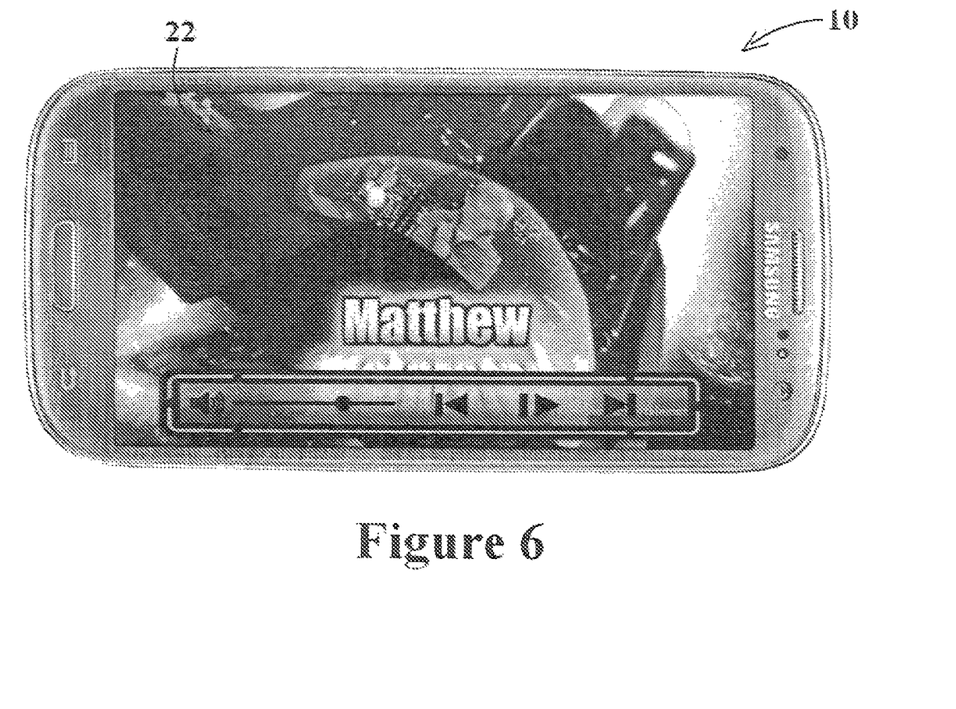
FIG. 6 shows a further schematic representation of an electronic device in running an application for making a personalised cinematographic film, in accordance with the invention.
Figure 7:
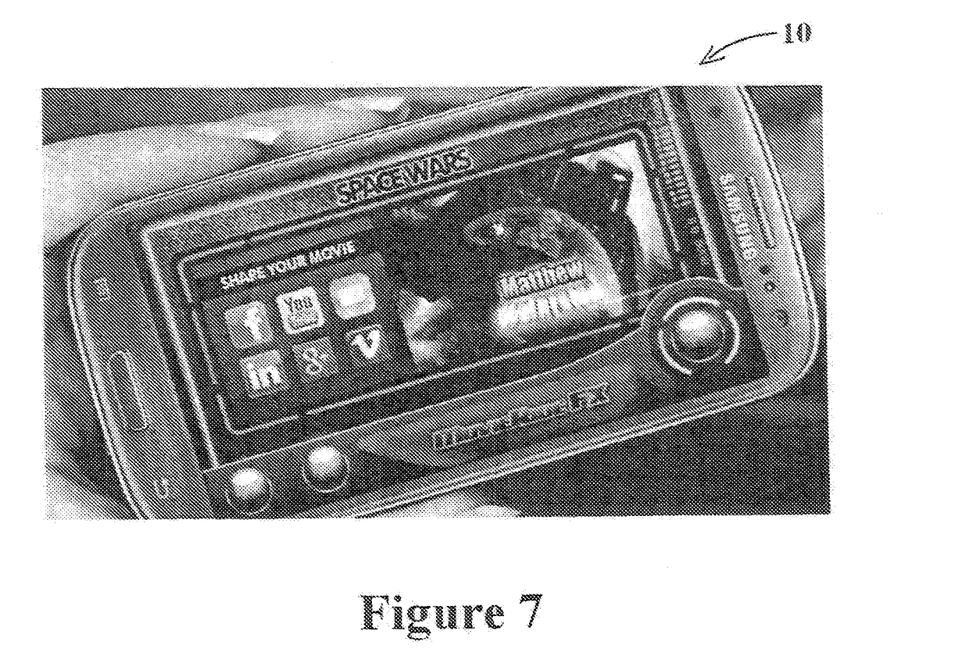
FIG. 7 shows a further schematic representation of an electronic device in running an application for making a personalised cinematographic film, in accordance with the invention.

As shown in FIG. 7 the completed personalized cinematographic film can be uploaded and shared between users of the application or other interested parties.

The application can be categorized into the following subsystems:

1) Compositing Engine—provides the ability to layer multiple layers of video/still imagery with keyframeable attributes such as 2D translation, opacity and image effects as well as pre-compositing. The user video along with a pre-packaged template are used as an input to the compositing engine to create the final video clip where the user appears to be in a "Hollywood"-style movie clip.

2) Capture Engine—provides the user with the ability to record the video necessary for later use in a pre-packaged template (preset).

3) Content Management subsystem—This provides the user with the ability to view their output videos and share these on various social networks as well as compiling clips belonging to the same series into longer clips to complete an entire series.

4) Sales/Billing subsystem—provides the ability for users to purchase new template clips.

The compositing engine is the heart of the application and responsible for the isolation and extraction of an actor from a user-recorded video clip and the subsequent insertion and compositing of that actor into another movie clip. The compositing engine is however not limited to this particular application but we have chosen this particular application in the overall design of application templates to demonstrate it's novelty and innovativeness. The compositing engine achieves this through the following features:

Composites multiple layers of video or still imagery together to create a new composite output video.

Not limited to a specific number of video layers. Theoretically a potentially infinite number of layers can be composited together, practically only limited by device memory and operating system API.

Capable of "pre-compositing" video/still layers with a mask layer (nested composites).

Capable of compositing layers with different pixel blending modes.

Capable of handling in-points and out-points for video layers on a longer output timeline effectively combining the features of video editing with compositing.

Capable of handling different media formats as an input or output. Jpeg, Png with alpha for still images. Mpeg4, 3 Gpp or H.264 for video and mp3 or wave for audio.

Capable of composting videos at different frame rates while correctly interpreting them so as to prevent temporal distortion.

Capable of animating opacity and 2D spacial translation (position, scale and rotation) of video layers over time through "keyframes".

Capable of compositing animated text-based layers with keyframable attributes, text styles (Outlines, color, bold, italic) etc.

Allow for the addition of an audio file to be attached for the final output video.

Capable of reading the required data for a composite from a template definition file (based on xml). The data specifies the ordering of layers, their source files on local media, pre-compositing of layers with layer masks, 2D spacial translation, opacity, blending mode, image filters, output format and filename, attachment of an audio file and any keyframeable attributes.

Make provision within the compositing engine for image effect filters such as "blur" or "glow" for example. These could also potentially have animated properties that change over time such as "blur amount" (again specified in the template definition file). These will be developed as and when they are needed, however the interface into the compositing engine will be developed. (In the interim a luminance/chroma keying (or combination of these) filter will be developed).

Figure 8:
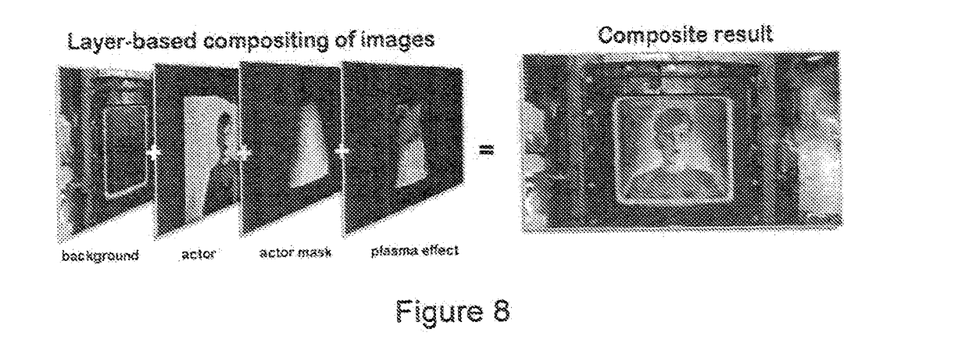
FIG. 8 shows a layer-based compositing of images and composite result, in accordance with the invention.

Compositing:

With reference to FIG. 8, compositing is the process of the combining of separate visual elements to form a new single image. In the context of the application, this occurs through a layer-based approach where multiple image-based frames of video are combined to produce a new visual output. Typically this occurs through a mathematical summation/division/multiplication of pixel data between the different image-based frames often taking the opacity and transparency (alpha) of each layer into consideration. In this example different mathematical algorithms are used to combine the pixel data for each image layer. These are commonly referred to as pixel blending modes or Porter-Duff Blending Modes (Potter-Duff being a subset of blending modes in general). The exact algorithms of these blending modes are not of technical importance to this document however it is important to note that different pixel blending modes produce completely different visual results and can be used to create entirely different visual effects and is thus an important capability within a compositing engine. For example using the very same layers in the above example, if the "plasma effect" were to be composited using a "Difference" blending mode as opposed to a "Screen" blending mode would produce the image to the right. In addition to this the opacity (transparency) of each layer may be taken into to affect the composited result.

Figure 9:
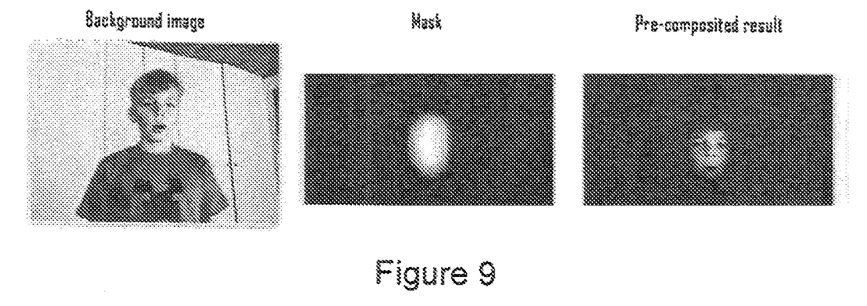
FIG. 9 shows masking and pre-compositing an image, in accordance with the invention.

Masking and Pre-Compositing:

In digital compositing the method to isolate and extract visual elements from an image requires the use of "masking" (sometimes also referred to as deepetching, mattes or rotoscoping). A mask is a visual element that specifies which pixels are to be extracted from another image. See FIG. 9. This process of image extraction requires the ability for software to "pre-composite" (pre-calculating the result of) the image and a mask together and compute the result separately from any compositing with any other layers of imagery. For example perhaps the actor is to be composited into a background scene. If the mask is then applied in the composite with the actor and the background scene, the background scene will also be masked out giving the incorrect result. Hence the software must be capable of pre-compositing the result of the actor and the mask and then supplying the result of that "nested composite" to a "parent composite". This is referred to as "pre-compositing".

Figure 10:
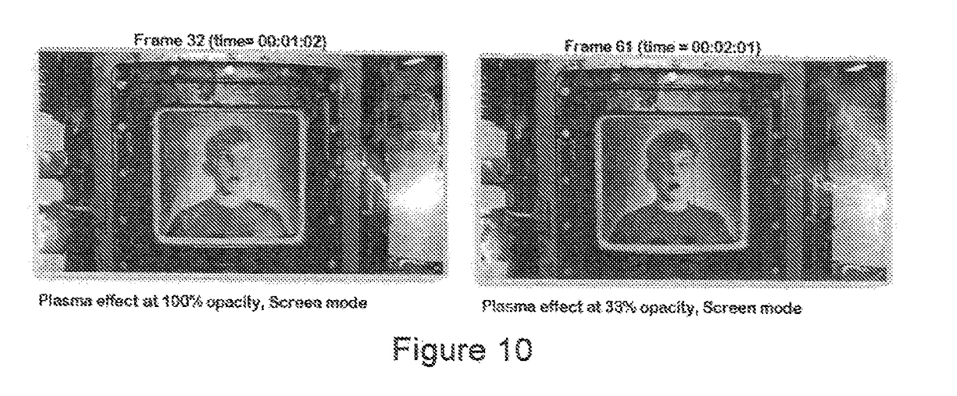
FIG. 10 shows a schematic representation of keyframing, in accordance with the invention.

Keyframes:

The above examples serve to explain the process of compositing of several images into a single image. While the practice is fairly common in terms of stills photography and graphic design in the case of still images, the process when applied to video or film adds the dimension of time. In this case the video or film sequence over time is divided into single image-based frames (or occasionally fields in the case of interlaced video) each occurring at a specific time in the overall video sequence and played back one after the other to create the appearance of motion in the video. (See image on the left). Different video standards exist where a different rate at which each still image is in the sequence is displayed and this referred to as the "frame rate" of the video. For example cinematic film is generally filmed and played back at 24 frames per second whereas the NTSC standard of video plays video frames at a rate 29.97 or 30 frames per second. The implications of this for compositing in video and film are that since the still frames of each layer would generally change over time there should be a way to manipulate each still frame's content over time. The method to accomplish this digitally is called "keyframing" or "keyframe animation". This allows one to specify changes to the attributes of each layer over time. For example if one wanted the "plasma effect" layer in the above example to fade out over time one would keyframe the opacity (transparency) of the layer. See FIG. 10. Keyframing may be applied to many other attributes of a video based layer besides opacity. For example the placement in 2-dimensional space of the layer may change, in other words the layer's 2D X and Y pixel co-ordinates and any other available attribute may change over time. (In the case of 2-dimensional spacial transformation we would refer to this as "2D transformation"). In the example below the video layer at frame 32 has a different special transformation from the same layer on frame 61. The rotation, scale and X-Y (top, left) dimensions have been changed. The 2D transform keyframes could be said to be different for these particular frames.

Figure 11:
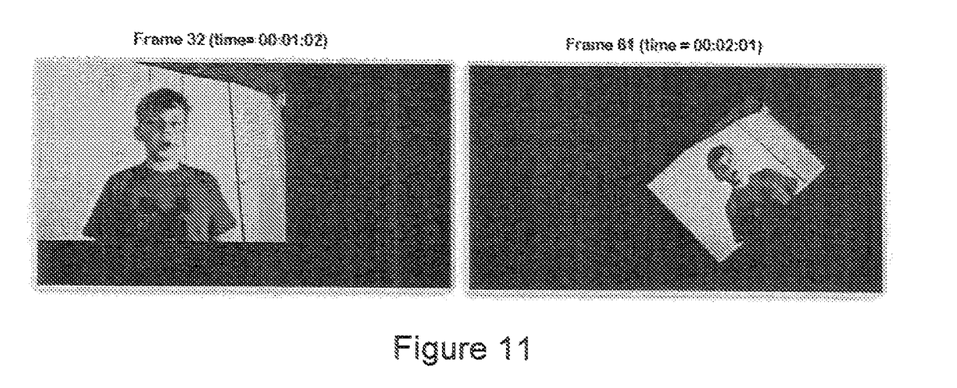
FIG. 11 shows a schematic representation of keyframe interpolation, in accordance with the invention.

With reference to FIG. 11, in the case of digital compositing a visual effect's artist would manually specify the 2D transform keyframes of the layer in the above example in a professional compositing application. The software would then mathematically calculate the correct positions for the in-between frames (frames 33 to 60). This feature of compositing software is called keyframe interpolation.

Video Resolutions and Framerates:

The resolution of a video generally refers to the horizontal and vertical number of pixels of digital video. For example, one of the standards for High Definition (HD) video accommodates video frames of 1920 pixels of horizontal resolution and 1080 pixels of vertical resolution. Support for differing video resolutions in terms of compositing software or video editing software generally refers to the ability of that software to handle and process videos of varying or arbitrary resolution, often allowing them to be composited together into a single output of arbitrary resolution regardless of their differing resolutions.

Support for different frame rates with regards to video editing/compositing software generally refers to the software's ability to handle and process video of differing frame rates often to be used together with other videos with differing frame rates and often for output at an arbitrary fame rate. Some software has the ability to create in-between frames using a process called "frame blending" when the video being processed has a frame rate lower than the frame rate required for final video output. For example, if the desired output video frame rate was 30 frames per second and the input video had a frame rate of 15 frames per second, the software could generate in-between frames to produce a total of 30 frames per second by blending the each frame of video with its subsequent frame to produce an in-between frame. The result would produce a smoother effect compared to each frame simply being duplicated alongside itself in the sequence to produce 30 frames per second.

Image Filters

Figure 12:
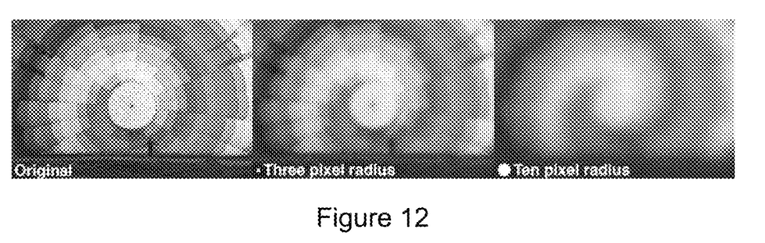
FIG. 12 shows a Gaussian blur filter, in accordance with the invention.

In the context of digital compositing, image filters allow for various mathematical operations at the pixel level. A typical example of this would be a Gaussian blur filter as seen in FIG. 12. While the number and types of image filters are too numerous to explore in-depth in this document it is important to note that professional visual effects compositing software often makes use of such filters. Compositing software typically has a "plugin interface" to allow for future development of image filters (occasionally through third parties) to allow for new types of pixel operations to be performed on an image-based layer. Typically the properties of these filters can also be keyframed so that the effect may be animated over time. In the above example a Gaussian blur may have a 3 pixel radius at one frame of the video frame sequence and may have a 10 pixel radius at some other frame of the sequence. This is an important feature as each image filter can create a new visual effect.

Video Editing

Figure 13:
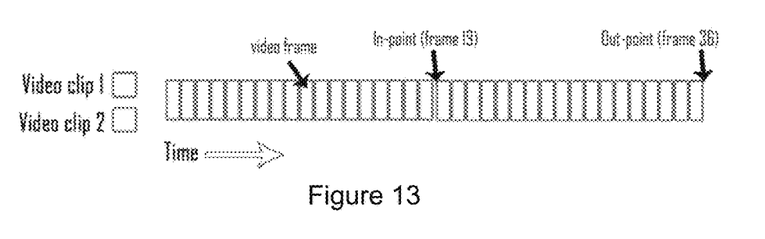
FIG. 13 shows a schematic representation of digital video editing, in accordance with the invention.

Digital video editing software differs from digital compositing software in that it is typically used to combine the frames from different video sequences across time rather than across 2-dimensional space and time. For example, one video sequence of 2 seconds may be placed alongside another video sequence of 5 seconds to produce a seamless video of 7 seconds in length. This is often achieved by specifying an "in-point" and an "out-point" for any particular video sequence that is to be rendered on a longer output sequence timeline. For example if a video sequence had an in-point of 00:03:15 and an out-point of 00:04:15 on a 30 frames per second output timeline, that video would appear at 3 and a half seconds into the final rendered output video's playback and no longer be visible at 4 and a half seconds into the output video's playback. See FIG. 13. Professional video editing software has many more aspects to it but these are outside the scope of this document, however the use of in-points and out-points for video layers are often also used in professional compositing applications to specify the placement of a layer of video frames on a longer sequence of video.

Reliance on Third Party Applications

The application according to the invention relies on the APIs provided by the various device operating systems (at this time Android and iOS) to perform the actual compositing of video frames a video frames into bitmap objects in device memory. In other words these APIs generally perform the actual summation/division/multiplication etc. of pixel data on bitmap objects in device memory. In addition, the FFMPEG, JavaCC and OpenCV libraries are used mainly for video decoding and encoding and the translation of video frames into bitmap objects for later compositing. The compositing engine makes calls to these APIs for the following functions:

Reading of media files from the file system into device RAM

Conversion of video media (decoding) into still frames as Bitmap objects

Conversion of video frames from YUV to RBG bitmap objects

Compositing together of multiple bitmap objects at the pixel level using arbitrary opacity and pixel blending modes (Porter-Duff modes) typically through an API "Canvas object".

Scaling and translation of bitmap images in 2D space using transform matrices.

Rendering of vector-based text into bitmap images for compositing with other bitmaps Conversion of RGB images to YUV images for output to video Saving of the output video file into mpeg4/H264 or another specified format.

Facial tracking.

The Compositing Engine

The compositing engine is open-ended and not limited to any given number of layers—rather it is only limited by the available device memory. In addition, mask layers can be nested with other layers effectively allowing for pre-composites. One of the ways that composite videos can be rendered through the compositing engine is via a standard template definition file created by artist and technicians. These XML Template definition files define the data for any particular composite and the compositing engine loads this data at run-time creating and performing the necessary compositing operations. A template definition file typically defines the following data for a template:

Video resolution, frame rate and compression for the output composited video

Specifies the source files for the camera live-feed overlay images

Audio information such as the number of audio channels and a sound effects file to be rendered with the video frames.

Various other details such as output filenames

The details of each layer of the composite including:
  Path to the source files for the composite
  In-points and out-points (where the layer begins and ends within a larger "parent" composite timeline)
  Pixel Blending mode of the layer
  2D transformation keyframe data across time (X, Y positions, rotation, rotation pivot, X, Y scale)
  Opacity keyframes over time (per frame)
  Any image filtering data and keyframe data over time (per frame)
  A mask layer used to mask out the layer with any of it's own attributes as above, 2D transformations, opactity over time etc.

Figure 14:
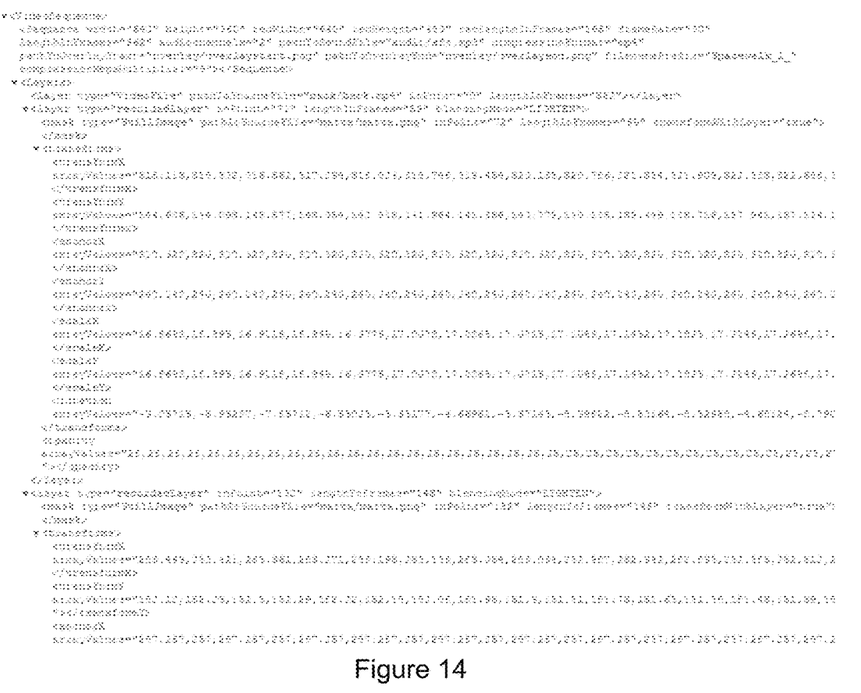
FIG. 14 shows a sample of an XML template definition for rendering composite videos, in accordance with the invention.

FIG. 14 is a sample of what an xml template definition file might look like. It's important to understand that all of this data is completely variable down to the video resolutions (even mixing layers of different resolutions and frame rates), the number of layers, their spacial and temporal information, any image filters etc. and are not limited in any way by the compositing engine itself. (Naturally there may be practical limitations within the device with regards to the practical resolutions of bitmaps or the playability of very high resolution or very low resolution videos and the number of layers that may be processed).

Spacial Transformation & Opacity Keyframing and Pixel Blending Modes Comparison

As described above, the compositing engine has the capabilities not only of layering different kinds of media in complex ways across space and time, but in addition each layer of visual media can have 2 dimensional transformations keyframed over time. This includes, 2D X-Y positioning, rotation, pivot point animation (affects spacial rotation). The actual pixel processing here occurs once again through the operating system APIs method calls that expose transformation matrices at the "canvas" level of a bitmap object. The compositing engine also does not apply interpolation to keyframes as this can be pre-computed and processing power is limited on mobile devices. The prior art systems do not demonstrate the ability to apply spacial transformation on layers over time. In addition, prior art systems have not demonstrated the ability to keyframe the opacity of a layer over time or the ability to apply different blending modes to layers. While some of the prior art video effect layers do fade in and out over time it is assumed that this is achieved through pre-calculated transparency of a video layer embedded within that video's alpha channel (since this is the simplest way to achieve such an effect). Although the invention also support this feature, the implication is that opacity changes and differing pixel blending modes cannot be applied to any user-recorded video since the opacity must be pre-calculated or "baked into" the actual video and the prior art systems do not demonstrate this ability.

Support for Different Video Resolutions/Framerates

According to the invention, the compositing engine is largely resolution independent and frame rate independent. Layers of different frame rates and resolutions can easily be mixed and matched with one another. In the case of supporting variable frame rates the compositing engine simply duplicated frames rather than applying a frame blending algorithm as processing speed is of the essence. For example a 10 frame per second video inside of a 30 frame per second composite will see the 10 frame per second video duplicate each frame twice to match 30 frames per second. The level at which prior art systems are capable of this is unknown however tests seem to indicate that they are capable in some cases of outputting both Standard Definition and High-definition (1280×720 pixels of resolution) videos.

Image Filters

The compositing engine according to the invention allows for image filters to be applied to each layer of visual media. The prior art systems do not exhibit the ability to perform image filtering on their video layers, except a "colour grading" effect that is applied at the end of a compositing pipeline. This may be considered an image filter in some regards however it's important to understand that this is a single effect applied to the final composite whereas the system according the invention's compositing engine is capable of applying different effects with keyframeable attributes across time at any particular image layer within a composite.

Chroma Keying

Chroma keying according to the compositing engine is considered to be one of the Image Filters as it uses that particular interface to the compositing engine. It is used in conjunction with the compositing engine's ability to apply masks to a layer of video for the isolation and extraction of visual elements.

Professional visual effects software relies on a visual effects artist to colour pick areas of a video frame that are to be "keyed out of" (removed from) the image however, the system according to the invention will automatically sample colors for removal at given 2D spacial locations defined in each template file. In this way an array of colour sampling points will be an attribute of the chroma keying image filter and in combination with the template definition file and the use of camera overlays. Users of the system will have foreknowledge of where these points will be located. (see the section on the Capture Engine) In addition, these sampling points may also be influenced by any facial tracking algorithms in that the inverse special transformations of facial tracking data may be taken into account to translate sampling points specifically where an actor's face may move over or near an area of chroma sampling. (See below for more details on facial tracking.)

Tracking and Stabilization

The compositing engine will make use of the OpenCV and JavaCV libraries to acquire facial tracking data to enable video stabilization. The inventors believe that the 2D spacial transformation the actor's face on each video frame will be used to apply an inverse transformation to the video to stabilize the motion of the actor's face for compositing with other layers. In addition, these video layers may have animated keyframe data as specified in a template definition file and as such the resultant spacial transformations of such a layer will be calculated based on both the inverse transformation of facial tracking data coupled with keyframe data to facilitate both video stabilization as well as the correct spacial placement of an actor's face in a movie clip.

Keyframable Text Layers

The compositing engine allows for the rasterization of vector text into video layers for inclusion in the compositing pipeline. These text layers have the same attributes as video and still layers and can be animated with keyframes over time including 2D special transformations, opacity, pixel blending modes etc. In addition, text can have various styles applied such as outlines, bold, italic, strikethrough and a drop shadow element can also be specified. The data for such text layers is loaded into the compositing engine once again through a template definition file. The Text layers are created as a vector graphic and are rasterized into pixel data through calls to the operating system API. In this way complex text effects can be added to composites.

Figure 15:
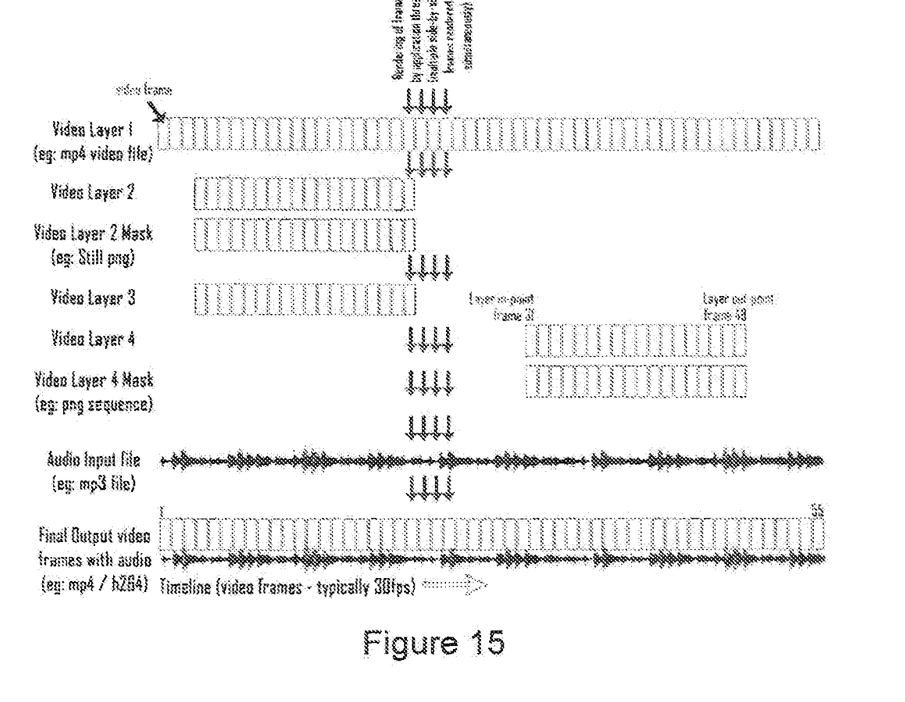
FIG. 15 shows an example of a compositing engine configuration, in accordance with the invention.

One advantage of the invention is the compositing engine's temporal capabilities. Its important to note that unlike what the prior art systems have demonstrated, layers can be stacked across time in different ways with some layers loading and unloading at different in-points and out-points across time. In addition, the ability to mix multiple kinds of media such as still frames with video frames or still image sequences can be performed. FIG. 15 illustrates an example of how the invention's compositing engine could be configured for a composite in this way.

The Capture Engine

In order to extract the technical and artistic difficulties in creating a professional looking visual effects video away from the user of the system, the system includes preset template clips that have been created by visual effects industry professionals. Part of the data in these templates is used to guide the user in the correct framing of an actor in a scene to be recorded by the device's camera by the use of a visual camera overlay guide. The resultant recorded video is then used later by the compositing engine for extraction and placement of the actor in a visual effects video.

According to the invention the system includes a Capture module, which module has the following features;

- A Camera Capture Screen with the live camera feed and a preset overlay with transparency used as a guide for actor placement by darkening out areas of the camera's live feed that are outside the bounds of action (user performance) and by providing hard outlines for exact actor placement.
- Detects lighting conditions and makes recommendations to users in terms of producing better video.
- Records for the required designated amount of time according to the preset template (dependent on device features)
- Allow the user to switch between front-facing or rear facing camera depending on what is available on the device.
- Output the recorded video to a temporary file for later use by the compositing engine.

Camera Feed and Overlay Guides

Figure 16:
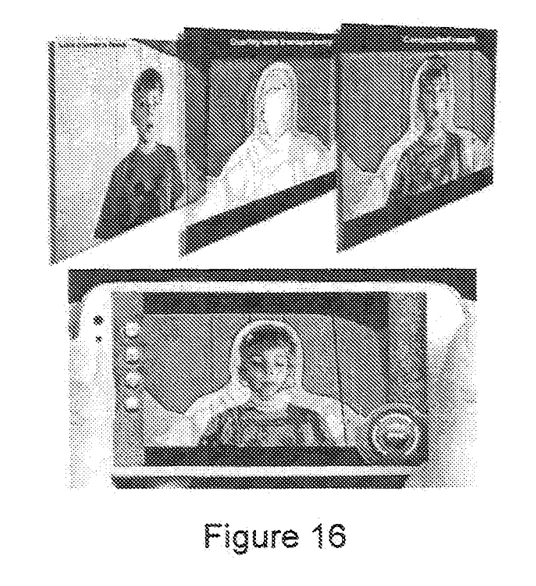
FIG. 16 shows an schematic representation of layering or compositing of a live feed with an overlay camera screen, in accordance with the invention.

The Capture Engine relies on the Operating System's API to interface with the device's camera, the light sensors and the device's capability to record output from its camera's feed. An overlay guide for actor placement (that has been prepared for the specific template by industry professions with an alpha channel containing transparency) is composted over the camera's live feed through the operating system's ability to layer multiple images/views/windows on the device's screen while honouring transparency of any given image. See FIG. 16 for layering ("compositing") of live feed with overlay Camera Screen (what the user sees).

Figure 17:
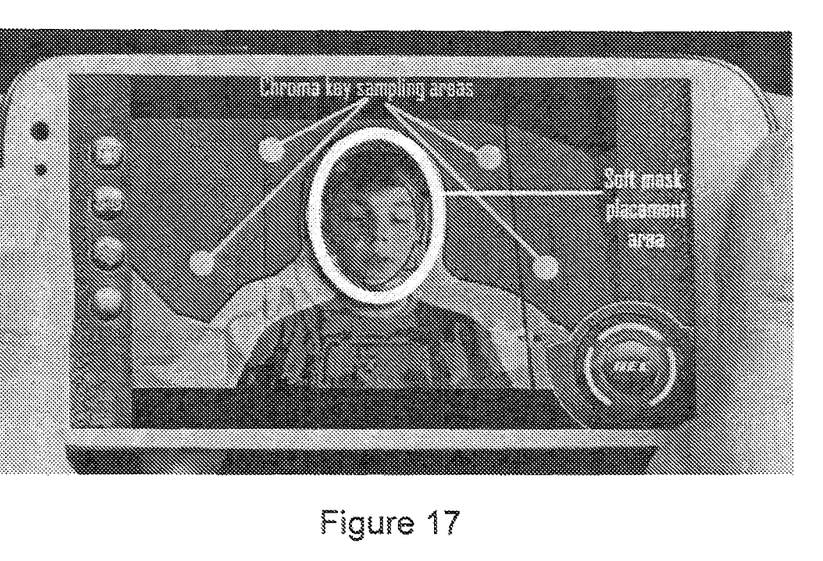
FIG. 17 shows a further schematic representation of an electronic device in running an application for making a personalised cinematographic film, in accordance with the invention.

The overlay does not get recorded as part of the initial recorded video, it is merely used to suggest actor placement to the user recording the video. Since actor placement is now technically "known" in terms of the general X-Y pixel boundaries for the specific video it is also possible to know the X-Y pixel coordinates of where to sample the video for chroma or luminance keying—outside of the area of general actor movement. This allows MovieRideFx to automate colour sampling for chroma keying and mask placement for the extraction of the actor from the video. In professional compositing software this typically requires an artist to "colour pick" specific colours to be sampled for chroma keying. See FIG. 17.

The actual compositing takes place later in the compositing engine and the areas to be sampled are specified as part of the preset template data. In addition to this, it is also possible to make recommendations to any facial tracking third party library (OpenCV) about the general area of the actor's face (in terms of x-y pixel coordinates in the video) so as to eliminate any other faces in the video or elements that may be confused for faces (such as posters or photos on a wall for example) to assist with video stabilizing and motion correction in the compositing process that occurs later in the compositing engine. The data from facial tracking may also in turn be used to make adjustments to the X-Y coordinates for Chroma key sampling.

Light Sensor

In order to optimize the quality of the video the system makes calls to the device's light sensor to check lighting conditions. If lighting is below a certain threshold the application makes recommendations to the user to improve lighting conditions and may also automatically turn on any available flash in a continuous lighting mode. (This is dependent on device hardware). This is achieved through calls to the operating system API. The result, if the user follows the advice is a higher quality video with less image noise and a higher frame rate which is better for compositing (especially for chroma/luminance keying) and produces an overall better result.

Recording a Designated Amount of Time

The system only records the required number of seconds of video needed for the final composite video. This is achieved by making calls to the device's operating system API (if the feature is available) or through a manual timer callback on a separate thread, or both. The specifics of the length of required video are specified as part of the data for that particular template.

Front-Rear Camera Switching

This is achieved through calls to the operating system API and is only available if the device has both a rear and front facing camera.

Video Recording

The user's video is recorded through the operating system API and saved to a temporary file on the local device storage for later use by the compositing engine.

Content Management Subsystem

- Features a Gallery screen where users can list and view the videos they have created
- Features a Video Player screen where users can view their videos
- Features a Template Preview Screen where users can see a "trailer" or sample of the template
- Allows users to share their creations on social networks such as FaceBook or through email attachments or Youtube (facilitated through the operating System API)
- Features a Clip Compiler screen where users can edit multiple clips belonging to the same series together to create a full length "mini-movie". Users will simply select their recordings from the gallery (where they have recorded clips from templates) and allocate them to a pre-defined "slot". They will fill all the necessary slots needed to compile a full-length mini-movie together and type in their name (which will be used for a credit roll)

The clip compiler uses a novel method to facilitate video editing where users need no editing skills to edit clips together. A clip compiler preset is set up detailing the in-points and out-points for each clip belonging to a longer "mini move" sequence. For example, a full "mini movie" may be made up of four different templates edited together on a single timeline to create a longer sequence with beginning, middle and end to the story "arc". These would typically not be the full length templates as they were recorded by the user as there is likely to be some overlap between each individual template and so clip compiler presets would define in-points and out-points for each of these to be edited together into the longer sequence. In addition, users will be able to type their name into the clip compiler and a final "credit roll" with their name as the lead actor would be editing on to the end of the entire sequence. All of these features would leverage off the flexibility of the compositing engine, but in this example with its ability to behave as a video editor (typically without any layering across space but rather layering of videos across time) and the rendering of the user's name into a credit roll will use the compositing engine's ability to render and animate text (as previously discussed). This further demonstrates the flexibility of the compositing engine to be used in a completely different way.

Templates

Templates will be downloadable from an applications store.

A further advantage of the invention is that it becomes a possibility for any user of the application to play part in a film with major special effects, and this is no longer limited actors in major films with an extensive budget.

A further advantage of the invention is that it provides multiple possibilities for media branding and product placement. For example, the cinematographic template may include a specific brand, or may be themed to a specific event or release. Similarly the captured footage may also include marketing materials and brand names, viewable by all those who have access to the central database. Finally the completed personalized film may be watermarked or branded with additional marketing material.

It shall be understood that the examples are provided for illustrating the invention further and to assist a person skilled in the art with understanding the invention and are not meant to be construed as unduly limiting the reasonable scope of the invention.

The invention claimed is:

1. A system for inserting digital footage into a digital cinematographic template, which system includes:

a mobile device;

storage means on the mobile device for storing a digital cinematographic template;

video recording means on the mobile device for recording and capturing personal cinematographic footage;

an overlay guide displayed on a video recording interface over a live feed of the video recording means in order to establish borders within which the footage will be differentiated and isolated;

digital isolation means on the mobile device for isolating specific sections of captured personal cinematographic footage, wherein isolating includes the steps of sampling pixels that fall outside the area of an object or actor within the established border, and removing the varying pixels to remove the background;

digital extraction means on the mobile device for extracting the isolated sections of the captured personal cinematographic footage; and digital insertion means on the mobile device for inserting the extracted footage into the stored cinematographic template; and compositing engine for use with the system, which compositing engine is configured to process a template definition file, which file defines the following data;

Video resolution, frame rate and compression for the output composited video;

Specifies the source files for the camera live-feed overlay images;

Audio information such as the number of audio channels and a sound effects file to be rendered with the video frames; and output filenames;

wherein the details of each layer of the composite comprise:

Path to the source files for the composite;

In-points and out-points where the layer begins and ends within a larger "parent" composite timeline;

Pixel Blending mode of the layer;

2D transformation keyframe data across time including one or more of X, Y positions, rotation, rotation pivot, X, Y scale;

Opacity keyframes over time per frame;

Any image filtering data and keyframe data over time per frame; and

A mask layer used to mask out the layer with any of its own attributes as above, 2D transformations, opacity over time.

2. A system for inserting digital footage into a digital cinematographic template as claimed in claim 1, which system includes a video compositing engine for rendering video through the compositing engine using a standardised template definition file created by artist and technicians.

3. A system for inserting digital footage into a digital cinematographic template as claimed in claim 2, wherein the cinematographic template typically takes the form of a short film, with specific characters omitted.

4. A system for inserting digital footage into a digital cinematographic template as claimed in claim 1, wherein the digital isolation is done in conjunction with tracking the movement of the mobile device and/or edge movement detection.

5. A system for inserting digital footage into a digital cinematographic template as claimed in claim 1, which includes the use of a layering system with different sections of the digital template assigned various layers.

6. A system for inserting digital footage into a digital cinematographic template, as claimed in claim 5, wherein the extracted footage is to be inserted between the assigned layers, in order to integrate the extracted footage into the digital template.

7. An electronic device for making a personalised cinematographic film which electronic device includes:

a storage medium for storing a digital cinematographic template;

a camera for recording and capturing digital cinematographic footage;

a processor operable to run an integrated application which application is configured to:

displaying an overlay guide on a video recording interface of the device over a live feed of the camera in order to establish borders within which the footage will be differentiated and isolated;

isolate specific parts of the captured digital cinematographic footage by sampling pixels that fall outside the area of an object or actor within the established border, and removing the varying pixels to remove the background;

extract the isolated sections of the digital footage; and insert the extracted digital footage into the digital cinematographic template in order to form a personalised cinematographic template; and wherein the electronic device further includes a compositing engine which is configured to process a template definition file, which file defines the following data;

Video resolution, frame rate and compression for the output composited video;

Specifies the source files for the camera live-feed overlay images;
Audio information such as the number of audio channels and a sound effects file to be rendered with the video frames; and
output filenames;
wherein the details of each layer of the composite comprise:
  Path to the source files for the composite;
  In-points and out-points where the layer begins and ends within a larger "parent" composite timeline;
  Pixel Blending mode of the layer;
  2D transformation keyframe data across time, including one or more of X, Y positions, rotation, rotation pivot, X, Y scale;
  Any image filtering data and keyframe data over time per frame; and
  A mask layer used to mask out the layer with any of its own attributes as above, 2D transformations, opacity over time.

* * * * *

UNITED STATES PATENT AND TRADEMARK OFFICE
CERTIFICATE OF CORRECTION

Page 1 of 1

PATENT NO.         : 10,008,238 B2
APPLICATION NO.    : 14/888654
DATED              : June 26, 2018
INVENTOR(S)        : Grant Waterston and Johann Mynhardt It is certified that error appears in the above-identified patent and that said Letters Patent is hereby corrected as shown below:

In the Claims

After Column 17, Line 15, Claim 7, Line 41 --Opacity keyframes over time per frame;-- should be inserted.

Signed and Sealed this
Ninth Day of October, 2018

Andrei Iancu
*Director of the United States Patent and Trademark Office*